United States Patent [19]
Hasebe et al.

[11] Patent Number: 5,592,907
[45] Date of Patent: Jan. 14, 1997

[54] VALVE OPERATING SYSTEM FOR MULTI-CYLINDER INTERNAL COMBUSTION ENGINE

[75] Inventors: Tetsuya Hasebe; Kazuhide Kumagai, both of Saitama, Japan

[73] Assignee: Honda Giken Kogyo Kabushiki Kaisha, Tokyo, Japan

[21] Appl. No.: 475,790

[22] Filed: Jun. 7, 1995

[30] Foreign Application Priority Data

Aug. 25, 1994 [JP] Japan .................... 6-200386

[51] Int. Cl.$^6$ .................. F01L 13/00; F02D 13/06
[52] U.S. Cl. .................. 123/90.16; 123/198 F; 123/308
[58] Field of Search ............. 123/90.15, 90.16, 123/90.17, 90.22, 90.23, 90.27, 90.39, 198 F, 308, 432

[56] References Cited

U.S. PATENT DOCUMENTS

| | | | |
|---|---|---|---|
| 5,207,193 | 5/1993 | Sugimoto et al. | 123/90.16 |
| 5,388,552 | 2/1995 | Sugimoto et al. | 123/90.16 |
| 5,456,225 | 10/1995 | Oikawa et al. | 123/90.16 |
| 5,495,832 | 3/1996 | Fujii et al. | 123/90.16 |

FOREIGN PATENT DOCUMENTS

| | | |
|---|---|---|
| 291357 | 11/1988 | European Pat. Off. . |
| 560323A1 | 9/1993 | European Pat. Off. . |
| 639693A1 | 2/1995 | European Pat. Off. . |
| 2-24888 | 7/1990 | Japan . |
| 2-50284 | 11/1990 | Japan . |
| 2197686 | 5/1988 | United Kingdom . |

*Primary Examiner*—Weilun Lo
*Attorney, Agent, or Firm*—Lyon & Lyon

[57] ABSTRACT

In a valve operating system for a multi-cylinder internal combustion engine, which is capable of closing and stopping operation of both of a pair of intake valves in a cylinder to provide a stopped state of a cylinder, intake valves are independently operatively connected to first and second driving rocker arms which abut against a pair of stopping portions provided in a completely circular shape without a cam lobe on a cam shaft. A first free rocker arm is provided and abuts against a substantially stopping cam, and a second free rocker arm is provided and abuts against an operating cam. A first connection switch-over device is provided in the first driving rocker arm and the first free rocker arm, and a second connection switch-over device is provided in the second driving rocker arm and the second free rocker arm. A third connection switch-over device is provided in the first driving rocker arm, the second driving rocker arm and the second free rocker arm. Thus, it is possible to substantially close and stop only one of the intake valves in a low speed range of the engine to produce a swirl through the other intake valve, thereby improving the combustibility and the specific fuel consumption.

12 Claims, 7 Drawing Sheets

VALVE OPERATING SYSTEM FOR MULTI-CYLINDER INTERNAL COMBUSTION ENGINE

BACKGROUND OF THE INVENTION

1. Field of the Invention

The present invention relates to a valve operating system for a multi-cylinder internal combustion engine, and particularly, to a valve operating system for a multi-cylinder internal combustion engine, in which in a desired cylinder among a plurality of cylinders, both of a pair of intake valves can be closed and stopped.

2. Description of the Prior Art

A valve operating system capable of closing and stopping both of a pair of intake valves is conventionally known, for example, from Japanese Utility Model Publication No. 24888/90 and Japanese Patent Publication No. 50284/90.

In the known valve operating system, both of the pair of intake valves are operatively connected to a single driving rocker arm and opened and closed with the same operational characteristic. In a low speed operational range of the engine, both of the intake valves are opened and closed and hence, there is a failure to form a swirl in the combustion chamber to provide a stable combustion.

SUMMARY OF THE INVENTION

Accordingly, it is an object of the present invention to provide a valve operating system for a multi-cylinder internal combustion engine, wherein both of the intake valves can be closed and stopped to stop the cylinder and moreover, only one of the intake valves can be substantially closed and stopped in a low speed operational range of the engine, thereby enabling the formation of a swirl to improve the combustibility and specific fuel consumption.

To achieve the above object, according to an aspect and feature of the present invention, there is provided a valve operating system for a multi-cylinder internal combustion engine, comprising: a pair of intake valves independently operatively connected to first and second driving rocker arms which abut against a pair of truly circular shaped stopping portions provided on a cam shaft; a first free rocker arm abutting against a substantially stopping cam which is provided on a cam shaft and has a profile capable of bringing the intake valves into substantially stopped states, but permitting the intake valves to be slightly opened during their valve-opening timings; a second free rocker arm abutting against an operating cam which is provided on the cam shaft and has a profile capable of opening the intake valves; a first connection switch-over means provided in the first driving rocker arm and the first free rocker arm and capable of switching over the connection and disconnection of the first driving rocker arm and the first free rocker arm; a second connection switch-over means provided in the second driving rocker arm and the second free rocker arm and capable of switching over the connection and disconnection of the second driving rocker arm and the second free rocker arm; and a third connection switch-over means provided in the first driving rocker arm, the second driving rocker arm and the second free rocker arm and capable of switching over the connection and disconnection of the first driving rocker arm, the second driving rocker arm and the second free rocker arm.

With such arrangement, it is possible to switch over the following states from one to another: a state in which both of the intake valves are closed and stopped, a state in which one of the intake valves is substantially stopped, while the other intake valve is opened and closed with a characteristic corresponding to the profile of the operating cam; and a state in which both of the intake valves are opened and closed with the characteristic corresponding to the profile of the operating profile. In the condition in which one of the intake valves is substantially stopped in a low speed range of the engine and the other intake valve is opened and closed, a swirl is formed to enhance the combustibility, thereby leading to a reduction in fuel consumption and an improvement in driveability.

According to another aspect and feature of the present invention, there is provided a valve operating system for a multi-cylinder internal combustion engine, comprising: a pair of intake valves independently operatively connected to first and second driving rocker arms which abut against a pair of truly circular shaped stopping portions provided on a cam shaft; a first free rocker arm abutting against a substantially stopping cam which is provided on a cam shaft and has a profile capable of bringing the intake valves into substantially stopped states, but permitting the intake valves to be slightly opened during their valve-opening timings; a second free rocker arm abutting against a first operating cam which is provided on the cam shaft and has a profile capable of opening and closing the intake valves; a third free rocker arm abutting against a second operating cam which is provided on the cam shaft and has a profile capable of opening and closing the intake valves with a valve lift amount larger than that of the first operating cam; a first connection switch-over means provided in the first driving rocker arm and the first free rocker arm and capable of switching over the connection and disconnection of the first driving rocker arm and the first free rocker arm; a second connection switch-over means provided in the second driving rocker arm and the second free rocker arm and capable of switching over the connection and disconnection of the second driving rocker arm and the second free rocker arm; and a third connection switch-over means provided in the first driving rocker arm, the second driving rocker arm and the third free rocker arm and capable of switching over the connection and disconnection of the first driving rocker arm, the second driving rocker arm and the third free rocker arm.

With such arrangement, it is possible to switch over the following states from one to another: a state in which both of the intake valves are closed and stopped; a state in which one of the intake valves is substantially stopped, while the other intake valve is opened and closed with a characteristic corresponding to the profile of the first operating cam; and a state in which both of the intake valves are opened and closed with a characteristic corresponding to the profile of the second operating cam. In the condition in which one of the intake valves is substantially stopped in a low speed range of the engine and the other intake valve is opened and closed, a swirl is formed to enhance the combustibility, thereby providing a reduction in fuel consumption and an improvement in drivability. In a high speed range of the engine, both of the intake valves can be opened and closed with a characteristic suitable for the high speed range to provide an increase in engine output.

The above and other objects, features and advantages of the invention will become apparent from preferred embodiments taken in conjunction with the accompanying drawings.

BRIEF DESCRIPTION OF THE DRAWINGS

FIGS. 1 to 5 illustrate a first embodiment of the present invention, wherein

FIGS. 6 and 7 illustrate a second embodiment of the invention, wherein

DESCRIPTION OF THE PREFERRED EMBODIMENTS

Figure 1:
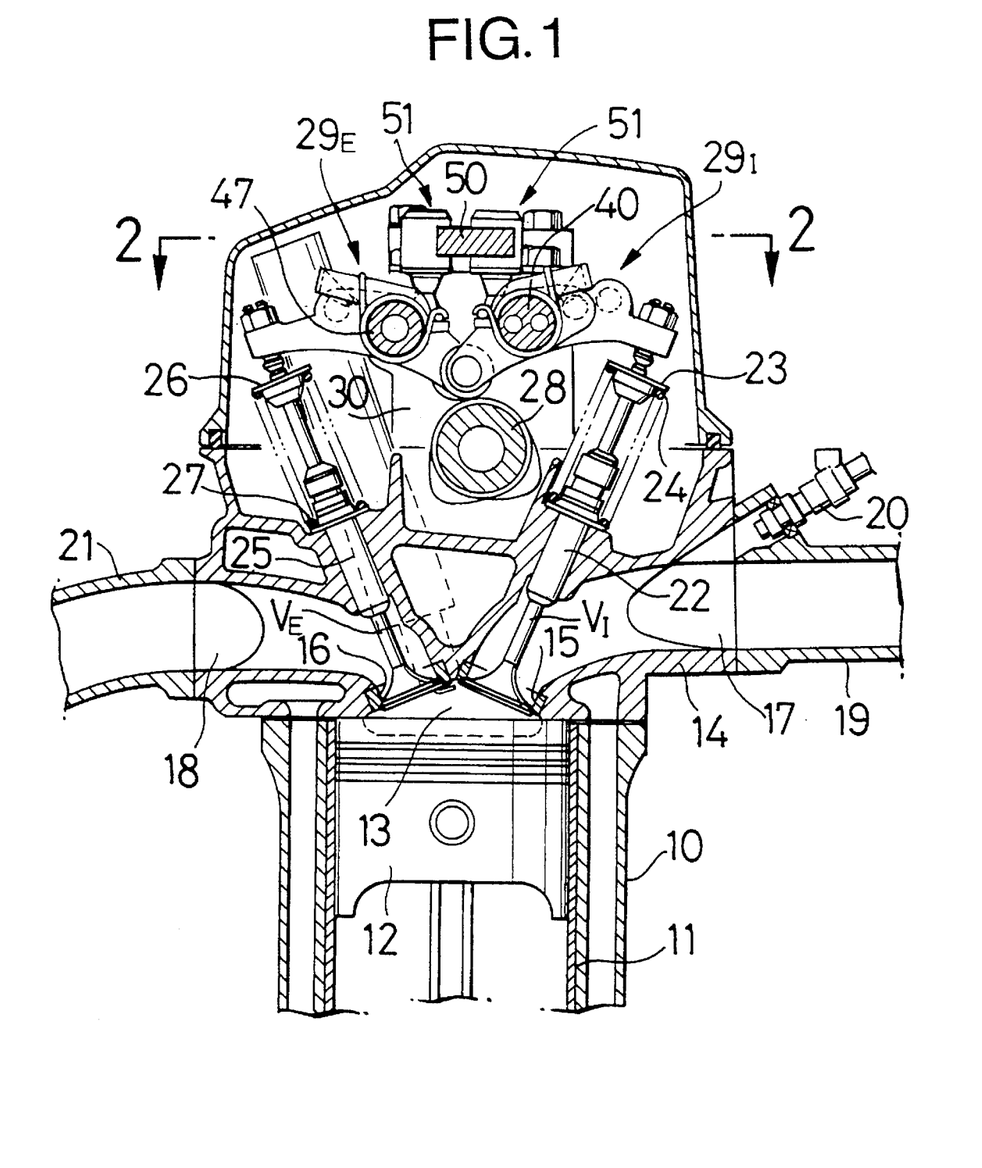
FIG. 1 is a vertical sectional side view of an internal combustion engine to which a valve operating system according to a first embodiment of the present invention is applied.

The present invention will now be described by way of an embodiment which is applied to an SOHC type multi-cylinder internal combustion engine in connection with the accompanying drawings. Referring first to FIG. 1, a plurality of cylinders 11 are provided in parallel in a cylinder block 10 of the SOHC type internal combustion engine, and a piston 12 is slidably received in each of the cylinders 11. A cylinder head 14 is coupled to an upper surface of the cylinder block 10 to define combustion chambers 13 between the cylinder head itself and the pistons 12. A pair of intake valve bores 15 and a pair of exhaust valve bores 16 are provided in the cylinder head 14 for each cylinder 11, so that they open into a ceiling surface of each of the combustion chambers 13. The intake valve bores 15 are in communication with intake ports 17 which open into one side of the cylinder head 14, and the exhaust valve bores 16 are in communication with exhaust ports 18 which open into the other side of the cylinder head 14. Fuel injection valves 20 for injection fuel toward the intake ports 17 are mounted to an intake manifold 19 which is connected to the cylinder head 14 through the intake ports 17, and an exhaust manifold 21 leading to the exhaust ports 18 is connected to the cylinder head 14.

A pair of intake valves $V_I$, $V_I$ capable of independently opening and closing the intake valve bores 15 are slidably fitted in guide sleeves 22 provided in the cylinder head 14 at a location corresponding to each of the cylinders 11 capable of having its operation stopped. Valve springs 24 surrounding the intake valves $V_I$, $V_I$ are compressed between the cylinder head 14 and retainers 23, 23 mounted at the upper ends of the intake valves $V_I$, $V_I$ which protrude upwardly from the guide sleeves 22. The intake valves $V_I$, $V_I$ are biased by the valve springs 24 in the direction to close the intake valve bores 15. A pair of exhaust valves $V_E$, $V_E$ capable of independently opening and closing the exhaust valve bores 16 are slidably fitted in guide sleeves 25 provided in the cylinder head 14. Valve springs 27 surrounding the exhaust valves $V_E$, $V_E$ are compressed between the cylinder head 14 and retainers 26, 26 provided at the upper ends of the exhaust valves $V_E$, $V_E$ which protrude upwardly from the guide sleeves 25. The exhaust valves $V_E$, $V_E$ are biased by the valve springs 27 in the direction to close the exhaust valve bores 16.

Figure 2:
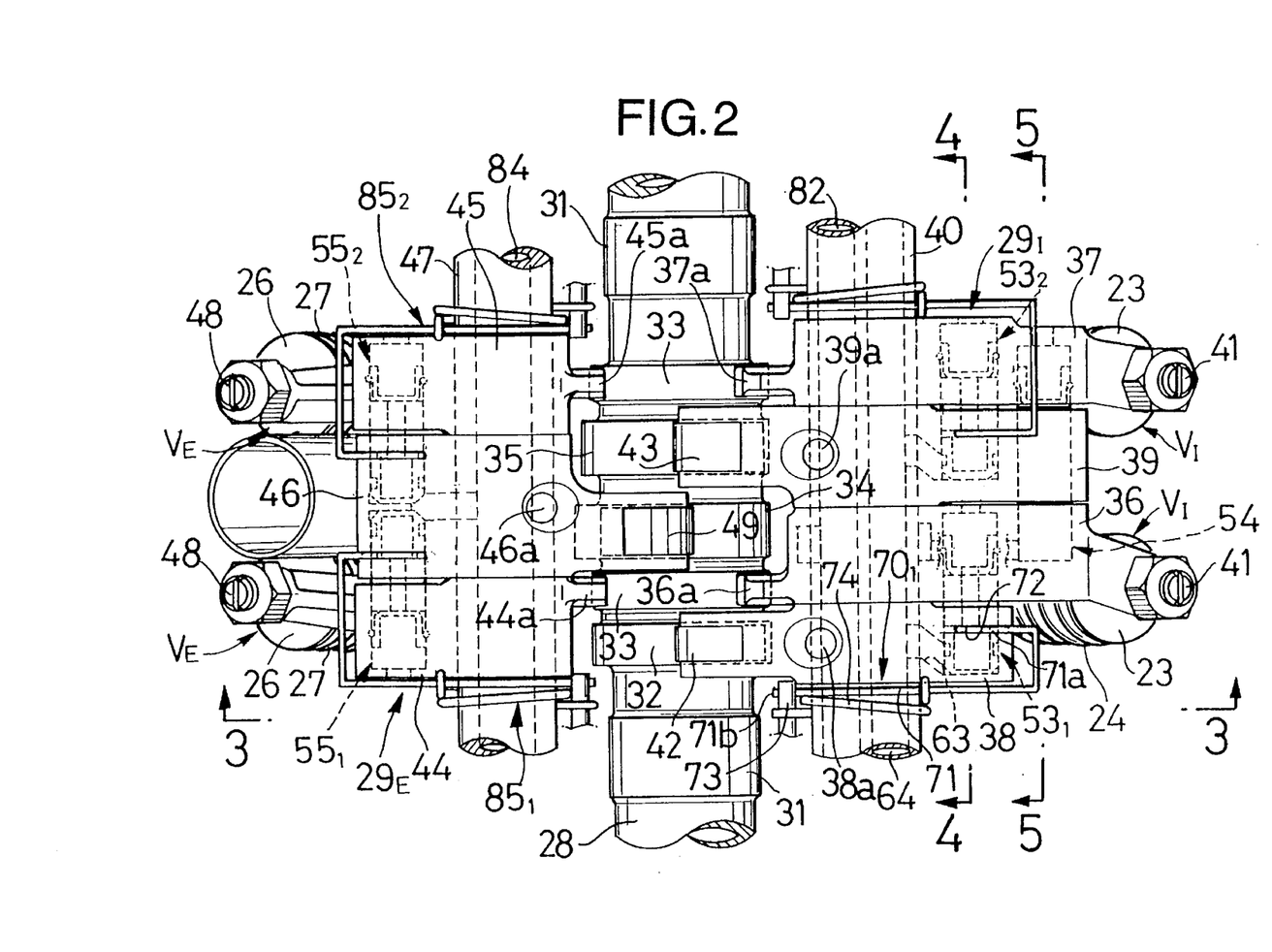
FIG. 2 is a plan view taken along a line 2—2 in FIG. 1.
Figure 3:
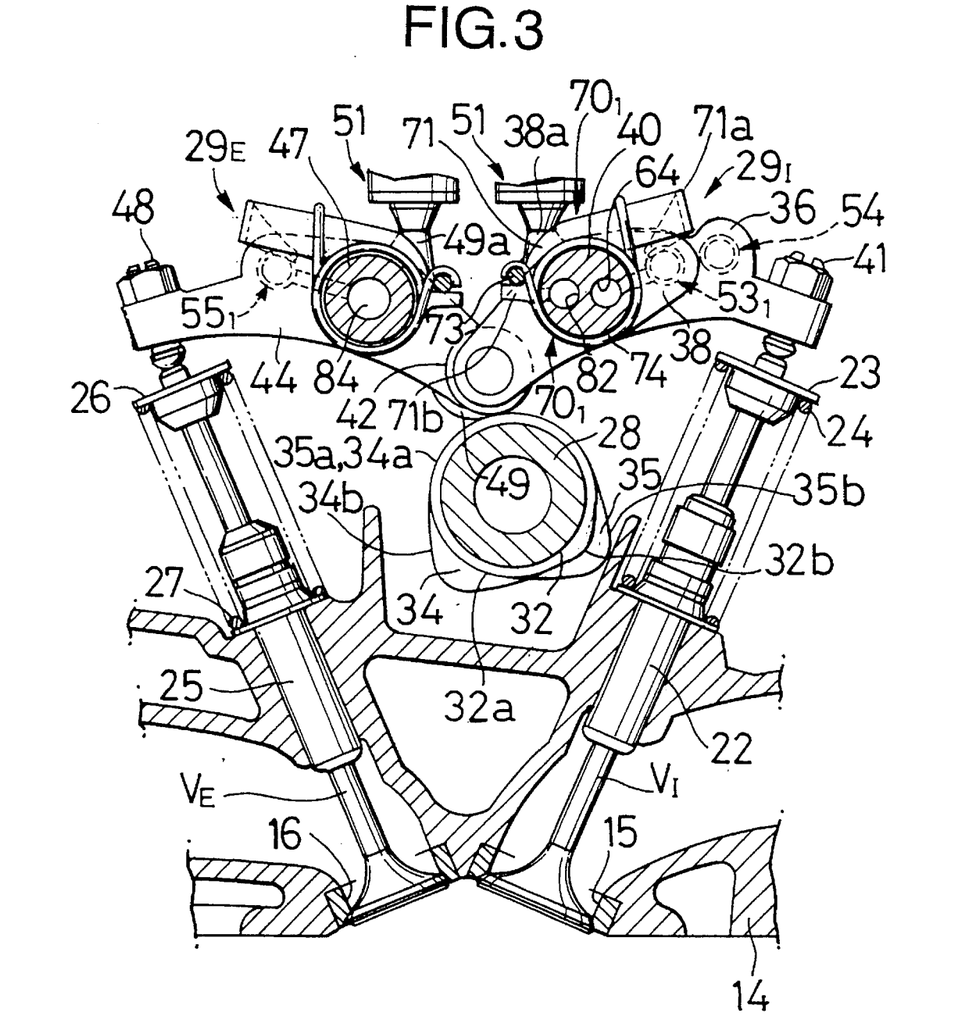
FIG. 3 is a sectional side view taken along a line 3—3 in FIG. 2.

Referring also to FIGS. 2 and 3 in combination, an intake valve operating device $29_I$ is provided between the intake valves $V_I$, $V_I$ and a cam shaft 28 operatively connected to a crankshaft (not shown) at a reduction ratio of ½ for converting the rotational motion of the cam shaft 28 into the opening and closing motions of the intake valves $V_I$, $V_I$. An exhaust valve operating device $29_E$ is provided between the exhaust valves $V_E$, $V_E$ and the cam shaft 28 for converting the rotational motion of the cam shaft 28 into the opening and closing motions of the exhaust valves $V_E$, $V_E$.

The cam shaft 28 has an axis parallel to the axis of rotation of the crankshaft and is rotatably carried by the cylinder head 14 and a holder 30 coupled to the cylinder head 14. Cam shaft journal portions 31, 31 are provided at a distance axially spaced from each other on the cam shaft 28 and rotatably carried between the cylinder head 14 and the holder 30. As also shown in FIGS. 4 and 5, the cam shaft 28 has a substantially stopping cam 32, a stopping portion 33, an exhaust valve operating cam 34, an intake valve operating cam 35 and a stopping portion 33, which are integrally provided thereon at locations sequentially spaced from each other between one of the cam journal portions 31 and the other cam journal portion 31.

The intake valve operating cam 35 has a profile capable of opening the intake valves $V_I$, $V_I$ and includes a base-circle portion 35a which is circular about the axis of the cam shaft 28, and a cam lobe 35b protruding radially outwardly from the base-circle portion 35a. The substantially stopping cam 32 has a profile capable of substantially stopping the intake valve $V_I$, but slightly opening the intake valve $V_I$ during its valve opening timing, and includes a base-circle portion 32a which is circular about the axis of the cam shaft 28, and a cam lobe 32b slightly protruding radially outwardly from the base-circle portion 32a. The stopping portion 33 is formed into a completely circular shape about the axis of the cam shaft 28 with the same radius as the base-circle portions 25a and 32a of the intake valve operating cam 35 and the substantially stopping cam 32 and without any cam lobe.

The exhaust valve operating cam 34 has a profile capable of opening the exhaust valve $V_E$ and includes a base-circle portion 34a which is circular about the axis of the cam shaft 28, and a cam lobe 34b protruding radially outwardly from the base-circle portion 34a.

Figure 4:
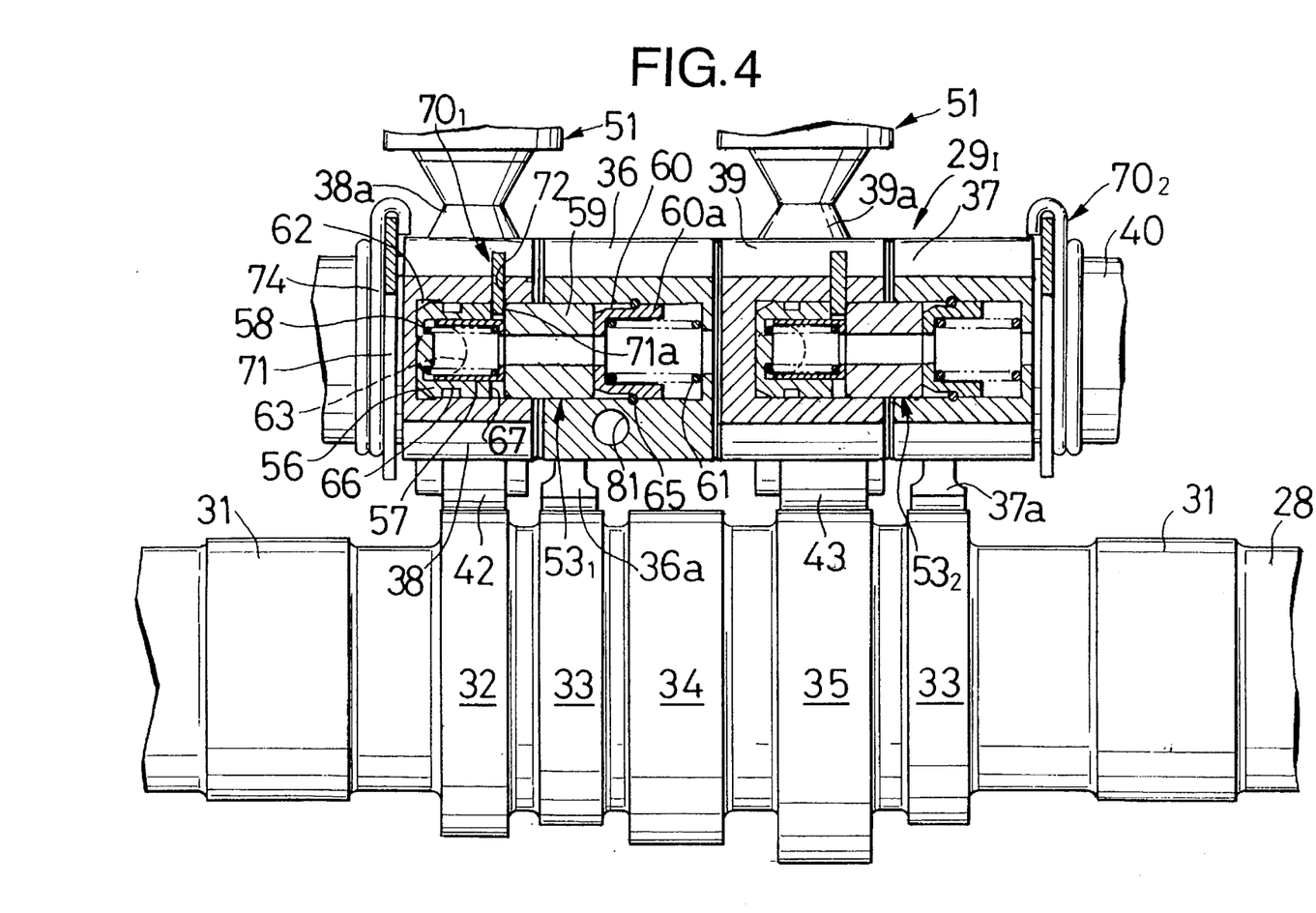
FIG. 4 is a sectional view taken along a line 4—4 in FIG. 2.
Figure 5:
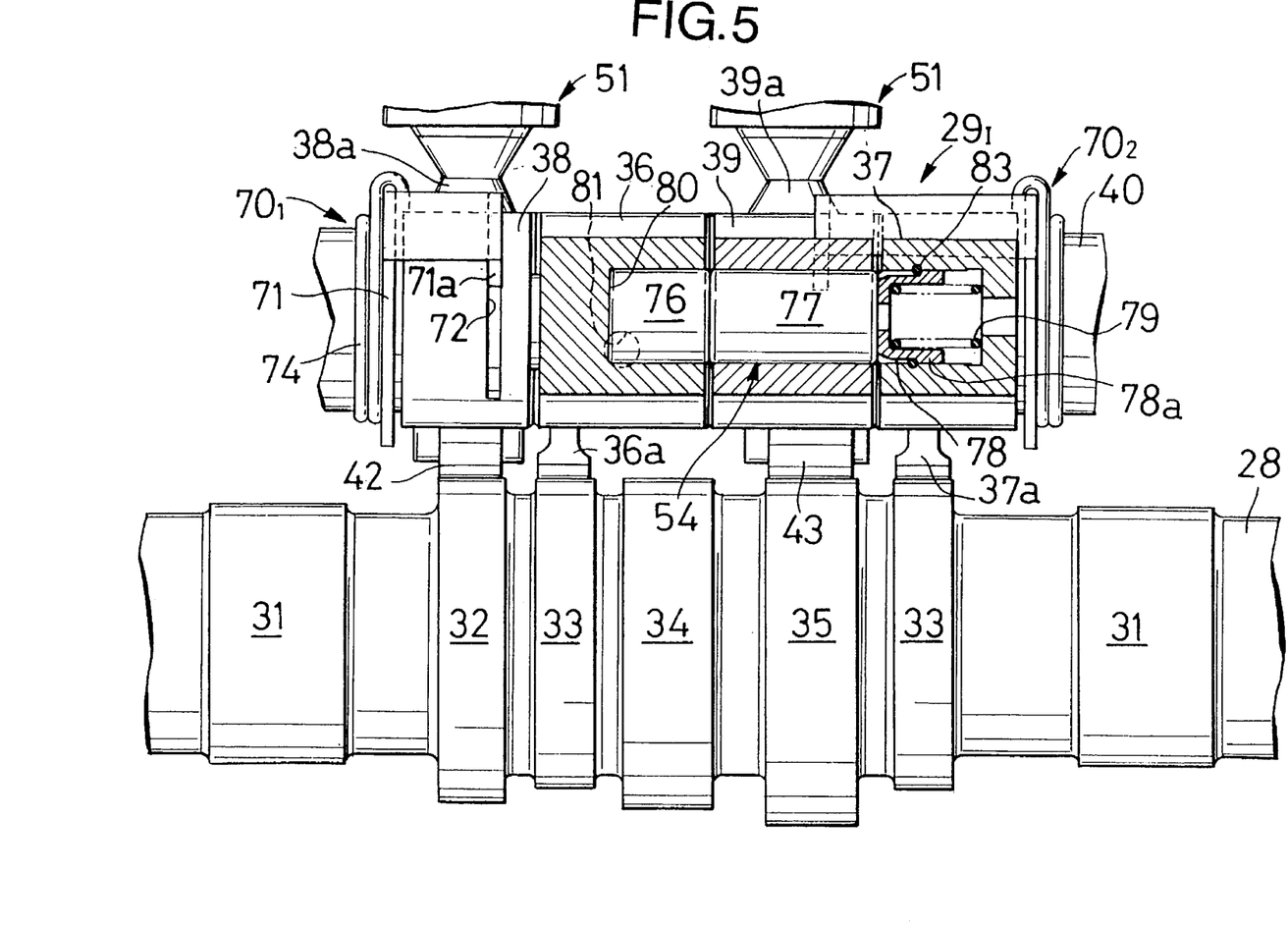
FIG. 5 is a sectional view taken along a line 5—5 in FIG. 2.

Referring also to FIGS. 4 and 5, the intake valve operating device $29_I$ includes first and second intake valve-side driving rocker arms 36 and 37, and first and second intake valve-side free rocker arms 38 and 39. The rocker arms 36 to 39 are swingably carried on an intake valve-side rocker shaft 40 which is fixedly supported by the holder 30 at a location laterally above the cam shaft 28.

Tappet screws 41, 41 are threadedly fitted in one end of each of the first and second intake valve-side driving rocker arms 36 and 37 to abut against upper ends of the intake valves $V_I$, $V_I$, so that their advanced positions can be adjusted. The first and second intake valve-side driving rocker arms 36 and 37 are provided at the other ends with abutment portions 36a and 37a which abut against the stopping portions 33, 33 of the cam shaft 28. The second intake valve-side free rocker arm 39 is disposed between the intake valve-side driving rocker arms 36 and 37, and the first intake valve-side free rocker arm 38 is disposed on the opposite side of the first intake valve-side driving rocker arm 36 from the second intake valve-side free rocker arm 39. A roller 42 is supported by a pin on the first intake valve-side free rocker arm 38 to be in rolling contact with the substantially stopping cam 32, and a roller 43 is supported by a pin on the second intake valve-side free rocker arm 39 to be in rolling contact with the intake valve operating cam 35.

The exhaust valve operating device $29_E$ includes first and second exhaust valve-side driving rocker arms 44 and 45, and an exhaust valve-side free rocker arm 46. The rocker arms 44 to 46 are swingably carried on an exhaust valve-side rocker arm shaft 47 which is fixedly supported by the holder 30 at a location laterally above the cam shaft 28.

Tappet screws 48, 48 are threadedly fitted in one end of each of the first and second exhaust valve-side driving rocker arms 44 and 45 to abut against upper ends of the exhaust valves $V_E$, $V_E$, so that their advanced positions can be adjusted. The first and second intake valve-side driving rocker arms 44 and 45 are provided at the other ends with abutment portions 44a and 45a which abut against the stopping portions 33, 33 of the cam shaft 28. The exhaust valve-side free rocker arm 46 is disposed between the exhaust valve-side driving rocker arms 44 and 45, and a roller 49 is supported by a pin on the exhaust valve-side free rocker arm 46 to be in rolling contact with the exhaust valve operating cam 34.

A support plate 50 is fixed on the holder 30 above the intake valve-side rocker arms 36 to 39 as well as the exhaust valve-side rocker arms 44 to 46, and lost motion mechanisms 51 are mounted on the support plate 50 in correspondence to the first and second intake valve-side free rocker arms 38 and 39 of the intake valve operating device $29_I$ as well as the exhaust valve-side free rocker arm 46 of the exhaust valve operating device $29_E$, respectively. Each of the lost motion mechanisms 51 has a spring (not shown) therein. The first and second intake valve-side free rocker arms 38 and 39 and the exhaust valve-side free rocker arm 46 have abutment projections 38a, 39a and 46a provided respectively at upper portions thereof to abut against the corresponding lost motion mechanisms 51. Thus, the first and second intake valve-side free rocker arms 38 and 39 are resiliently biased by the spring force exhibited by the lost motion mechanisms 51 in the direction to abut against the substantially stopping cam 32 and the intake valve operating cam 35, respectively, and the exhaust valve-side free rocker arm 46 is resiliently biased by the spring force exhibited by the lost motion mechanism 51 in a direction to abut against the exhaust valve operating cam 34.

In the intake valve operating device $29_I$, a first connection switch-over means $53_1$ is provided in the first intake valve-side driving rocker arm 36 and the first intake valve-side free rocker arm 38 and is capable of switching over the connection and disconnection of these rocker arms 36 and 38. A second connection switch-over means $53_2$ is provided in the second intake valve-side driving rocker arm 37 and the second intake valve-side free rocker arm 39 and is capable of switching over the connection and disconnection of these rocker arms 37 and 39. A third connection switch-over means 54 is provided in the first intake valve-side driving rocker arm 36, the second intake valve-side driving rocker arm 37 and the second intake valve-side free rocker arm 39 and is capable of switching over the connection and disconnection of these rocker arms 36, 37 and 39. In the exhaust valve operating device $29_E$, a connection switch-over means $55_1$ is provided in the first exhaust valve-side driving rocker arm 44 and the exhaust valve-side free rocker arm 46 and is capable of switching over the connection and disconnection of these rocker arms 44 and 46. A connection switch-over means $55_2$ is provided in the second exhaust valve-side driving rocker arm 45 and the exhaust valve-side free rocker arm 46 and is capable of switching over the connection and disconnection of these rocker arms 45 and 46.

Referring to FIG. 4, the first connection switch-over means $53_1$ provided between the first intake valve-side driving rocker arm 36 and the first intake valve-side free rocker arm 38 includes a piston 56 slidably received in the first intake valve-side free rocker arm 38, an urging pin 57 slidably received in the piston 56, a spring 58 mounted under compression between the piston 56 and the urging pin 57, a switch-over pin 59 abutting against the urging pin 57, a limiting member 60 slidably fitted in the first intake valve-side driving rocker arm 36 to abut against the switch-over pin 59 on the opposite side from the urging pin 57, and a return spring 61 mounted under compression between the limiting member 60 and the first intake valve-side driving rocker arm 36. The return spring 61 has a preset load set larger than the preset load of the spring 58.

The piston 56 is formed in a bottomed cylindrical shape with one end closed, and a hydraulic pressure chamber 62 is defined between the closed end of the piston 56 and the first intake valve-side free rocker arm 38. A communication passage 63 is provided in the first intake valve-side free rocker arm 38 to lead to the hydraulic pressure chamber 62 and is normally in communication with an oil passage 64 which is provided within the intake valve-side rocker arm shaft 40.

The urging pin 57 is formed in a bottomed cylindrical shape having an outside diameter which permits the urging pin 57 to be fitted into the piston 56. The urging pin is slidably fitted in the piston 56, so that its opened end is opposed to the closed end of the piston 56. The spring 58 is mounted under compression between the closed end of the piston 56 and a closed end of the urging pin 57.

The switch-over pin 59 is slidable between a position in which it is fitted in both the first intake valve-side free rocker arm 38 and the first intake valve-side driving rocker arm 36, as shown in FIG. 4, and a position in which it is fitted in the first intake valve-side driving rocker arm 36 in such a manner that its face abutting against the urging pin 57 corresponds to the boundary between the first intake valve-side driving rocker arm 36 and the first intake valve-side free rocker arm 38.

The limiting member 60 is formed in a bottomed cylindrical shape with one closed end abutting against the switch-over pin 59. The limiting member 60 is provided at the other end with a collar portion 60a which protrudes radially outwardly from the limiting member 60 and is slidably fitted in the first intake valve-side driving rocker arm 36. A retaining ring 65 is fitted in the first intake valve-side driving rocker arm 36 which abuts against the collar portion 60a of the limiting member 60 to limit the movement of the limiting member 60 toward one end, i.e., toward the switch-over pin 59.

The axial length of each of the switch-over pin 59 and the limiting member 60 is set such that when the limiting member 60 has been moved to a position in which the movement is limited by the retaining ring 65, the switch-over pin 59 extends across the boundary between the first intake valve-side driving rocker arm 36 and the first intake valve-side free rocker arm 38 to connect the rocker arms 36 and 38 to each other, but when the limiting member 60 has been moved while compressing the return spring 61 to a position in which the open end of the limiting member 60 abuts against the first intake valve-side driving rocker arm 36, the face of the switch-over pin 59 abutting against the urging pin 57 is located at the position corresponding to the boundary between the rocker arms 36 and 38. On the other hand, the piston 56 and the urging pin 57 are slidably fitted in the first intake valve-side free rocker arm 38 in such a manner that they are urged axially away from each other by the spring force of the spring 58 in a condition in which a portion of the switch-over pin 59 has been fitted in the first intake valve-side free rocker arm 38, as shown in FIG. 4.

An annular engagement groove 66 is provided around an outer periphery of the piston 56. When the piston 56 and the urging pin 57 are in their states in which they are extended away from each other, as shown in FIG. 4, an annular engagement groove 67 is defined around the urging pin 57 between the piston 56 and the switch-over pin 59.

A trigger mechanism $70_1$ is provided in combination with the first connection switch-over means $53_1$ for limiting the timing of the operation of the first connection switch-over means $53_1$. The trigger mechanism $70_1$ includes a trigger plate 71 which is swingable relative to the rocker arms 36 and 38 about the axis of the intake valve-side rocker arm shaft 40 between a position in which the trigger mechanism $70_1$ is engaged with the engagement groove 66 in the piston 56 or the engagement groove 67 between the piston 56 and the switch-over pin 59 to limit the movement of the piston 56, and a position in which the trigger mechanism $70_1$ is disengaged from either engagement groove 66 or 67 to permit the movement of the piston 57.

A slit 72 is provided in the first intake valve-side free rocker arm 38 at a location corresponding to the engagement groove 67 in a condition in which the piston 56 has been displaced to the maximum toward the hydraulic pressure chamber 62, as shown in FIG. 4. The engagement groove 66 is provided around the outer periphery of the piston 56, so that the engagement groove 66 is located at a position corresponding to the slit 72 in a condition in which the piston 56 and the urging pin 57 abutting against each other have been moved to the position in which the volume of the hydraulic pressure chamber 62 is maximized.

The trigger plate 71 is turnably carried on the intake valve-side rocker arm shaft 40. The trigger plate 71 is integrally provided with an engagement plate portion 71a which is disengageably engaged with the engagement groove 66 or 67 through the slit 72.

A stopper pin 73 is fixedly mounted in the cylinder head 14 to extend toward the first intake-side free rocker arm 38, and a stopper 71b is projectingly provided on the trigger plate 71 and is capable of abutting against the stopper pin 73 from below. A torsional spring 74 surrounding the intake valve-side rocker arm shaft 40 is locked at one end to the stopper pin 73 and at the other end to the trigger plate 71 from above. Thus, the trigger plate 71 is biased by the force of the torsional spring 74 in a direction to bring the stopper 71b into abutment against the stopper pin 73. The position of the stopper pin 73 is established, so that when the first intake valve-side free rocker arm 38 is in its stopped state in abutment against the base-circle portion 32a of the substantially stopping cam 32 in a condition in which the stopper 71b is in abutment against the stopper pin 73, the engagement plate portion 71a of the trigger plate 71 can be brought into engagement with the engagement groove 66 or 67 through the slit 72, and when the first intake valve-side free rocker arm 38 is swung in a valve-opening direction by the cam lobe 32b of the substantially stopping cam 32, the engage plate portion 71a is disengaged from the slit 72.

With the afore-described first connection switch-over means $53_1$ and trigger mechanism $70_1$, in a condition in which the hydraulic pressure in the hydraulic pressure chamber 62 has been released, the switch-over pin 59 is located at the position in which it extends across the boundary between the first intake valve-side driving rocker arm 36 and the first intake valve-side free rocker arm 38 to connect the rocker arms 36 and 38 to each other. In this case, the engagement plate portion 71a of the trigger plate 71 in the trigger mechanism $70_1$ is in disengagement from the engagement groove 67 when the first intake valve-side free rocker arm 38 is pivoted by the cam lobe 32b of the substantially stopping cam 32, and the engagement plate portion 71a is engaged with the engagement groove 67 when the first intake valve-side free rocker arm 38 is in its stopped state in sliding contact with the base-circle portion 32a of the substantially stopping cam 32.

If a hydraulic pressure is then applied to the hydraulic pressure chamber 62, the piston 56 is moved while compressing the spring 58, until it abuts against the switch-over pin 59 when the engagement plate portion 71a is disengaged from the engage groove. But at this time the switch-over pin 59 is in the state in which it extends across the boundary between the first intake valve-side driving rocker arm 36 and the first intake valve-side free rocker arm 38 to connect the rocker arms 36 and 38 to each other, so that a force in a shearing direction is applied to the switch-over pin 59. Therefore, the piston 56 is inhibited from being moved until it causes the switch-over pin 59 to be forced into the first intake valve-side operating rocker arm 36. However, when the first intake valve-side free rocker arm 38 starts to be brought into sliding contact with the base-circle portion 32a of the substantially stopping cam 32, so that the force in the shearing direction on the switch-over pin 59 is decreased, the piston 56 is moved until it forces the switch-over pin 59 into the first intake valve-side driving rocker arm 36, thereby releasing the connection of the rocker arms 36 and 38 to each other.

In a condition in which the connection of the rocker arms 36 and 38 to each other has been released in this manner, the engage plate portion 71a of the trigger plate 71 in the trigger mechanism $70_1$ is disengaged from the engagement groove 66 when the first intake valve-side free rocker arm 38 is pivoted by the cam lobe 32b of the substantially stopping cam 32, and the engagement plate portion 71a is engaged with the engagement groove 66 when the first intake valve-side free rocker arm 38 is in sliding contact with the base-circle portion 32a of the substantially stopping cam 32. When the hydraulic pressure in the hydraulic pressure chamber 62 has been released to connect the rocker arms 36 and 38 to each other, the piston 56 is moved by the spring force of the spring 58 to a position to minimize the volume of the hydraulic pressure chamber 62 in response to the first intake valve-side free rocker arm 38 being urged down by the cam lobe 32b of the substantially stopping cam 32, thereby causing the engagement plate portion 71a to be disengaged from the engagement groove 66. When the first intake valve-side free rocker arm 38 starts to be brought into sliding contact with the base-circle portion 32a of the substantially stopping cam 32, causing the axes of the urging pin 57 and the switch-over pin 59 to be aligned with each other, the switch-over pin 59 is moved to the position in which it extends across the boundary between the rocker arms 36 and 38 by the spring force of the return spring 61, thereby connecting the rocker arms 36 and 38 to each other.

The second connection switch-over means $53_2$ provided between the second intake valve-side driving rocker arm 37 and the second intake valve-side free rocker arm 39 has basically the same construction as the above-described first connection switch-over means $53_1$, and the trigger mechanism $70_2$ provided with the second connection switch-over means $53_2$ also has basically the same construction as the above-described trigger mechanism $70_1$. Therefore, the detailed description of the constructions of the second connection switch-over means $53_2$ and the trigger mechanism $70_2$ is omitted. The second connection switch-over means $53_2$ is operated for switching-over of the connection and disconnection synchronously with the first connection switch-over means $53_1$ in such a manner that when the first connection switch-over means $53_1$ disconnects the first intake valve-side driving rocker arm 36 and the first intake valve-side free rocker arm 38 from each other, the second connection switch-over means $53_2$ disconnects the second intake valve-side driving rocker arm 37 and the second intake valve-side free rocker arm 39 from each other, and when the first connection switch-over means $53_1$ connects the first intake valve-side driving rocker arm 36 and the first intake valve-side free rocker arm 38 to each other, the second connection switch-over means $53_2$ connects the second intake valve-side driving rocker arm 37 and the second intake valve-side free rocker arm 39 to each other.

Referring to FIG. 5, the third connection switch-over means 54 provided in the first intake valve-side driving rocker arm 36, the second intake valve-side driving rocker arm 37 and the second intake valve-side free rocker arm 39 includes a switch-over piston 76 capable of switching over the connection and disconnection of the first intake valve-side driving rocker arm 36 and the second intake valve-side free rocker arm 39, a switch-over pin 77 capable of switching over the connection and disconnection of the second intake valve-side free rocker arm 39 and the second intake valve-side driving rocker arm 37, a limiting member 78 provided in sliding contact with the switch-over pin 77 on the opposite side from the switch-over piston 76, and a return spring 79 for biasing the limiting member 78 toward the switch-over pin 77.

The switch-over piston 76 is slidably received in the first intake valve-side driving rocker arm 36, so that it can be fitted into the second intake valve-side free rocker arm 39. A hydraulic pressure chamber 80 is defined between one end of the switch-over piston 76 and the first intake valve-side driving rocker arm 36. A communication passage 81 is provided in the first intake valve-side driving rocker arm 36 to lead to the hydraulic pressure chamber 80, and the communication passage 81 leads to an oil passage 82 is provided within the intake valve-side rocker arm shaft 40 independently from the oil passage 64 and communication passages 63 that serve to operate the first and second connection switch-over means $53_1$ and $53_2$. Thus, the third connection switch-over means 54 is operable for switching-over independently from the first and second connection switch-over means $53_1$ and $53_2$.

The switch-over pin 77 is slidably received in the second intake valve-side free rocker arm 39, so that it can be fitted into the second intake valve-side driving rocker arm 37. One end of the switch-over pin 77 abuts against the other end of the switch-over piston 76.

The limiting member 78 is in the form of a bottomed cylindrical shape and slidably received in the second intake valve-side driving rocker arm 37. A closed end of the limiting member 78 abuts against the other end of the switch-over pin 77. A retaining ring 83 is fitted in the second intake valve-side driving rocker arm 37 and is adapted to abut against a collar 78a provided at an opened end of the limiting member 78 to limit the movement of the limiting member 78. The return spring 79 is mounted under compression between the limiting member 78 and the second intake valve-side driving rocker arm 37.

In the third connection switch-over means 54, when no hydraulic pressure is applied to the hydraulic pressure chamber 80, the abutting faces of the switch-over piston 76 and the switch-over pin 77 are located between the first intake valve-side driving rocker arm 36 and the second intake valve-side free rocker arm 39, and the abutting faces of the switch-over pin 77 and the limiting member 78 are located between the second intake valve-side free rocker arm 39 and the second intake valve-side driving rocker arm 37. Therefore, the rocker arms 36, 37 and 39 are in their disconnected states. When a hydraulic pressure is applied to the hydraulic pressure chamber 80, the switch-over piston 76 is moved to a position in which the other end thereof is fitted into the second intake valve-side free rocker arm 39, and the switch-over pin 77 is moved to a position in which the other end thereof is fitted into the second intake valve-side driving rocker arm 37, thereby connecting the rocker arms 36, 37 and 39 to one another.

In the exhaust valve operating device $29_E$, the connection switch-over means $55_1$ and $55_2$ provided respectively in the first exhaust valve-side driving rocker arm 44 and the exhaust valve-side free rocker arm 46 and in the second exhaust valve-side driving rocker arm 45 and the exhaust valve-side free rocker arm 46 have basically the same constructions as the first and second connection switch-over means $53_1$ and $53_2$ in the intake valve operating device $29_I$, and hence, the detailed description of the connection switch-over means $55_1$ and $55_2$ is omitted. However, the connection switch-over means $55_1$ and $55_2$ are constructed so that they are switched over synchronously with each other between connecting states attained upon releasing the hydraulic pressure in the oil passage 84 provided within the exhaust valve-side rocker arm shaft 47 and the disconnecting states attained upon application of the hydraulic pressure to the oil passage 84. Trigger mechanisms $85_1$ and $85_2$ having basically the same constructions as the above-described trigger mechanisms $70_1$ and $70_2$ are provided with the connection switch-over means $55_1$ and $55_2$, respectively.

The operation of the first embodiment now will be described. When all of the first, second and third connection switch-over means $53_1$, $53_2$ and 54 of the intake valve operating device $29_I$ and the connection switch-over means $55_1$ and $55_2$ of the exhaust valve operating device $29_E$ are caused to be in the disconnecting states during operation of the engine, the operation of the first and second intake valve-side driving rocker arms 36 and 37 and the first and second exhaust valve-side driving rocker arms 44 and 45 is stopped by the stopping portions 33, 33, and all of the intake valves $V_I$, $V_I$ and the exhaust valves $V_E$, $V_E$ remain closed or stopped, thereby providing the stopped state of the cylinder.

When the first and second connection switch-over means $53_1$ and $53_2$ in the intake valve operating device $29_I$ are operated to the connecting state while maintaining the third connection switch-over means 54 in the disconnecting state, and the connection switch-over means $55_1$, $55_1$ in the exhaust valve operating device $29_E$ are operated to the connecting state, the first intake valve-side driving rocker arm 36 is connected to the first intake valve-side free rocker arm 38; the second intake valve-side driving rocker arm 37 is connected to the second intake valve-side free rocker arm 39, and the first and second exhaust valve-side driving rocker arms 44 and 45 are connected to the exhaust valve-side free rocker arm 46. Therefore, one intake valve $V_I$ is substantially closed and stopped due to the fact that the first intake valve-side free rocker arm 38 is in the substantially stopped state provided by the substantially stopping cam 32, the other intake valve $V_I$ is opened and closed with a characteristic corresponding to the profile of the intake valve-side operating cam 35 by operation of the second intake valve-side free rocker arm 39 by the intake valve-side operating cam 35, and the exhaust valves $V_E$, $V_E$ are opened and closed with a characteristic corresponding to the profile of the exhaust valve-side operating cam 34. Thus, in a condition in which the one intake valve $V_I$ is in the substantially stopped state, a swirl can be produced within the combustion chamber 13 in response to the other intake valve $V_I$ being opened and closed, thereby enhancing the combustibility and performing the circulation of a large amount of exhaust gas and the lean combustion in a range of low speed of the engine to provide a reduction in specific fuel consumption and an enhancement in drivability.

Further, when the third connection switch-over means 54 of the intake valve operating device $29_I$ is operated to the connecting state and the connection switch-over means $55_1$, $55_1$ of the exhaust valve operating device $29_E$ is maintained in the connecting states, the first and second intake valve-side driving rocker arms 36 and 37 are connected to the second intake valve-side free rocker arm 39, and the first and second exhaust valve-side driving rocker arms 44 and 45 remain connected to the exhaust valve-side free rocker arm 46. Thus, the intake valves $V_I$, $V_I$ are opened and closed with the characteristic corresponding to the profile of the intake valve-side operating cam 35, and the exhaust valves $V_E$, $V_E$ are opened and closed with the characteristic corresponding to the profile of the exhaust valve-side operating cam 34.

Figure 6:
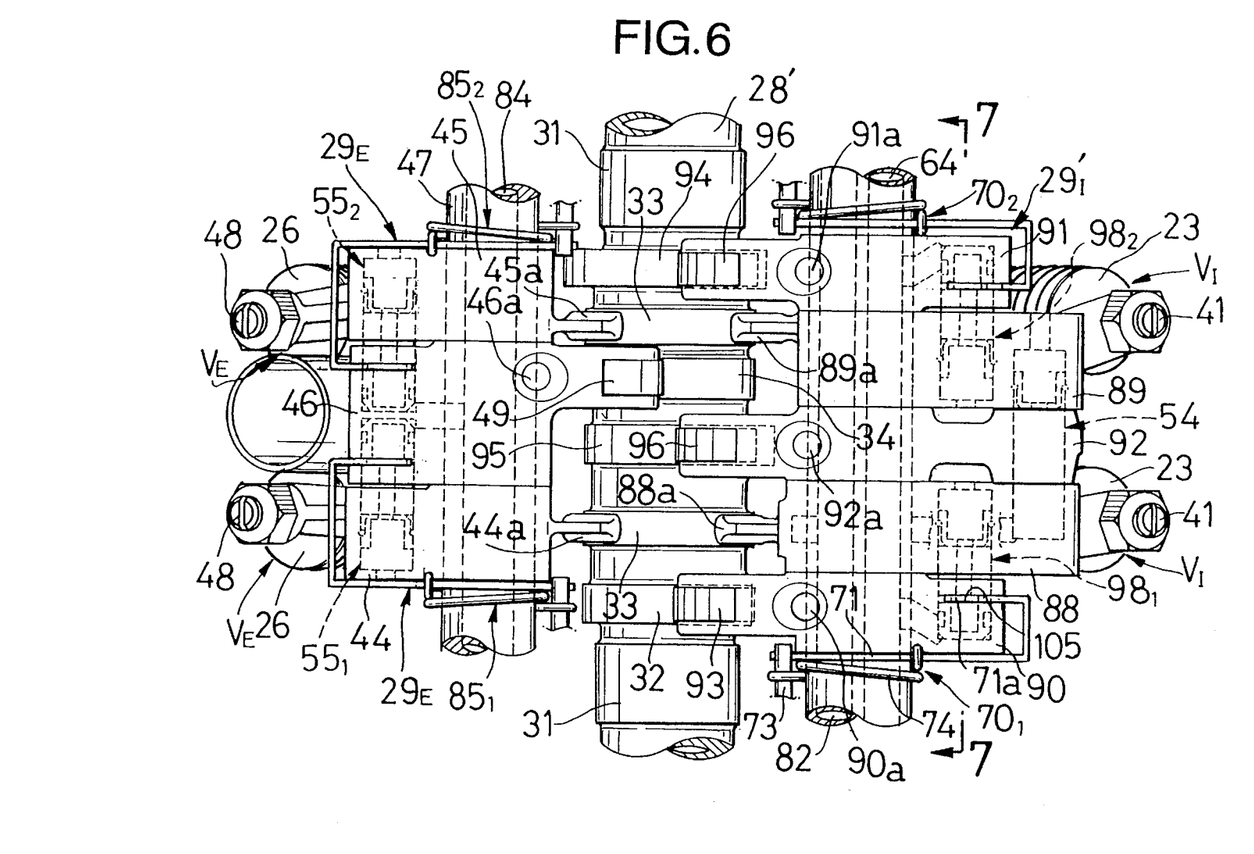
FIG. 6 is a plan view similar to FIG. 2, but illustrating a valve operating system according to a second embodiment of the present invention.
Figure 7:
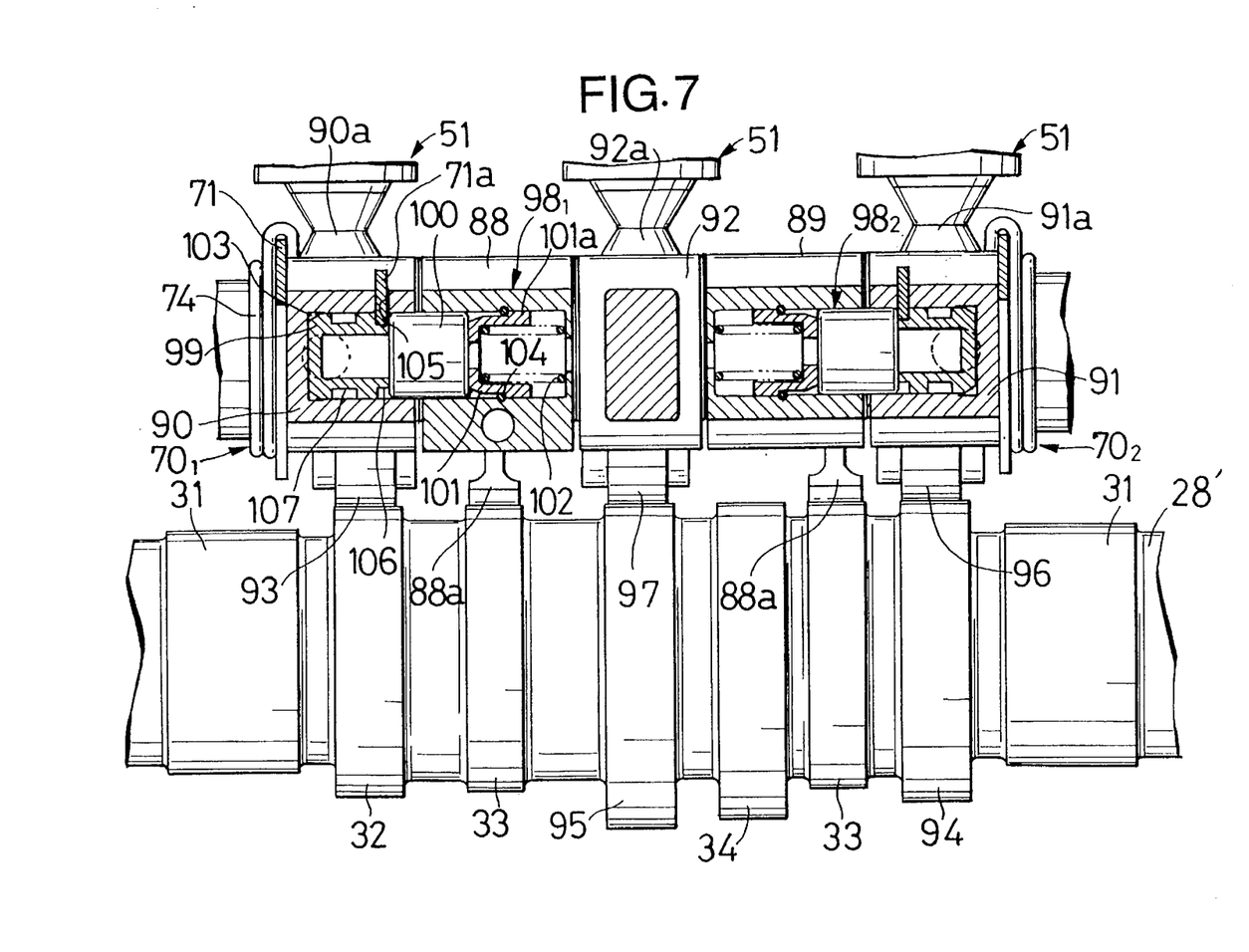
FIG. 7 is a sectional view taken along a line 7—7 in FIG. 6.

FIGS. 6 and 7 illustrate a second embodiment of the present invention, wherein portions or components corresponding to those in the first embodiment are designated by like reference characters and will not be described in detail again.

An intake valve operating device $29_I'$ is provided between a pair of intake valves $V_I$, $V_I$ and a cam shaft 28' for converting the rotating motion of the cam shaft 28' into opening and closing motions of the intake valves $V_I$, $V_I$, and an exhaust valve operating device $29_E$ is provided between exhaust valves $V_E$, $V_E$ and the cam shaft 28'.

The intake valve operating device $29_I'$ includes first and second intake valve-side driving rocker arm 88 and 89, and first, second and third intake valve-side free rocker arms 90, 91 and 92. The rocker arms 88 to 92 are swingably carried on the intake valve-side rocker arm shaft 40.

Tappet screws 41, 41 are threadedly fitted at one end of each of the first and second intake valve-side driving rocker arms 88 and 89 to abut against upper ends of the corresponding intake valves $V_I$, $V_I$. The first and second intake valve-side driving rocker arms 88 and 89 are provided at the other end with abutment portions 88a and 89a which abut against stopping portions 33, 33 provided on the cam shaft 28'. The third intake valve-side free rocker arm 92 is disposed between the two intake valve-side driving rocker arms 88 and 89, and the first intake valve-side free rocker arm 90 is disposed on the opposite side of the first intake valve-side driving rocker arm 88 from the third intake valve-side free rocker arm 92. The second intake valve-side free rocker arm 91 is disposed on the opposite side of the second intake valve-side driving rocker arm 89 from the third intake valve-side free rocker arm 92. A roller 93 is supported by a pin on the first intake valve-side free rocker arm 90 to be in rolling contact with the substantially stopping cam 32 provided on the cam shaft 28', and a roller 96 is supported by a pin on the second intake valve-side free rocker arm 91 to be in rolling contact with a first operating cam 94 provided on the cam shaft 28'. A roller 97 is supported by a pin on the third intake valve-side free rocker arm 92 to be in rolling contact with a second operating cam 95 provided on the cam shaft 28'.

The first operating cam 94 has a profile which permits one intake valve $V'_I$, to be opened in a range of low speed of the engine, and the second operating cam 95 has a profile which permits both the intake valves $V_I$, $V_I$ to be opened in a range of high speed of the engine and with a lift amount larger than that with the first operating cam 94.

The first, second and third intake valve-side free rocker arms 90, 91 and 92 are provided at their upper portions with abutment projections 90a, 91a and 92a, against which lost motion mechanisms 51 abut, respectively.

In the intake valve operating device $29'_I$, a first connection switch-over means $98_1$ is provided in the first intake valve-side driving rocker arm 88 and the first intake valve-side free rocker arm 90 and is capable of switching over the connection and disconnection of the rocker arms 88 and 90. A second connection switch-over means $98_2$ is provided in the second intake valve-side driving rocker arm 89 and the second intake valve-side free rocker arm 91 and is capable of switching over the connection and disconnection of the rocker arms 89 and 91. A third connection switch-over means 54 is provided in the first intake valve-side driving rocker arm 88, the second intake valve-side driving rocker arm 89 and the third intake valve-side free rocker arm 92 and is capable of switching over the connection and disconnection of the rocker arms 88, 89 and 92.

Referring especially to FIG. 7, the first connection switch-over means $98_1$ provided between the first intake valve-side driving rocker arm 88 and the first intake valve-side free rocker arm 90 includes piston 99 slidably received in the first intake valve-side free rocker arm 90, a switch-over pin 100 abutting against the piston 99, a limiting member 101 slidably received in the first intake valve-side driving rocker arm 88 to abut against the switch-over pin 100 on the opposite side from the piston 99, and a return spring 102 mounted under compression between the limiting member 101 and the first intake valve-side driving rocker arm 88.

A hydraulic pressure chamber 103 is defined between one end of the piston 99 and the first intake valve-side free rocker arm 90 and normally leads to the oil passage 64 provided in the intake valve-side rocker arm shaft 40. The switch-over pin 100 is slidable between a position in which it extends across the boundary between the first intake valve-side free rocker arm 90 and the first intake valve-side driving rocker arm 88, as shown in FIG. 7, and a position in which it is fitted in the first intake valve-side driving rocker arm 88, so that its face abutting against the piston 99 corresponds to the boundary between the first intake valve-side driving rocker arm 88 and the first intake valve-side free rocker arm 90.

The limiting member 101 is in the form of a bottomed cylindrical shape with one closed end abutting against the switch-over pin 101. A retaining ring 104 is fitted in the first intake valve-side driving rocker arm 88 and is adapted to abut against a collar 101a provided at an opened end of the limiting member 101 to limit the movement of the limiting member 101 toward the switch-over pin 100.

A trigger mechanism $70_1$ is provided in combination with the first connection switch-over means $98_1$, and the first intake valve-side free rocker arm 90 is provided with a slit 105 in which an engagement plate portion 71a of a trigger plate 71 of the trigger mechanism $70_1$ is disposed. An annular engagement recess 106 is provided around an outer periphery of an end of the piston 99 adjacent the switch-over pin 100, so that the engagement plate portion 71a can be brought into engagement with the engagement recess 106 through the slit 105 in a condition in which the switch-over pin 100 extends across the boundary between the first intake valve-side driving rocker arm 88 and the first intake valve-side free rocker arm 90, as shown in FIG. 7. An annular engagement groove 107 is provided around the outer periphery of an intermediate portion of the piston 99 so that it assumes a position corresponding to the slit 105 in a condition in which abutting faces of the piston 99 and the switch-over pin 100 are at a location corresponding to the boundary between the first intake valve-side driving rocker arm 88 and the first intake valve-side free rocker arm 90.

With the afore-described first connection switch-over means 98$_1$ and trigger mechanism 70$_1$, in a condition in which the hydraulic pressure in the hydraulic pressure chamber 103 has been released, the switch-over pin 100 extends across the boundary between the first intake valve-side driving rocker arm 88 and the first intake valve-side free rocker arm 90 to connect the rocker arms 88 and 90 to each other, as shown in FIG. 7. When the hydraulic pressure is applied to the hydraulic pressure chamber 103, the piston 99 is operated until it forces the switch-over pin 100 into the first intake valve-side driving rocker arm 88, thereby releasing the connection of the rocker arms 88 and 90.

The second connection switch-over means 98$_2$ provided between the second intake valve-side driving rocker arm 89 and the second intake valve-side free rocker arm 91 has basically the same construction as the above-described first connection switch-over means 98$_1$ and hence, the detailed description of the construction of the second connection switch-over means 98$_2$ is omitted. The second connection switch-over means 98$_2$ is operated synchronously with the first connection switch-over means 98$_1$ in such a manner that when the first connection switch-over means 98$_1$ disconnects the first intake valve-side driving rocker arm 88 and the first intake valve-side free rocker arm 90 from each other, the second connection switch-over means 98$_2$ disconnects the second intake valve-side driving rocker arm 89 and the second intake valve-side free rocker arm 91 from each other, and when the first connection switch-over means 98$_1$ connects the first intake valve-side driving rocker arm 88 and the first intake valve-side free rocker arm 90 to each other, the second connection switch-over means 98$_2$ connects the second intake valve-side driving rocker arm 89 and the second intake valve-side free rocker arm 91 to each other.

The operation of the second embodiment will be described below. When the first, second and third connection switch-over means 98$_1$, 98$_2$ and 54 of the intake valve operating device 29$_I$' and the connection switch-over means 55$_1$ and 55$_2$ of the exhaust valve operating device 29$_E$ are all caused to be in the disconnecting states during operation of the engine, the first and second intake valve-side driving rocker arms 88 and 89 and the first and second exhaust valve-side driving rocker arms 44 and 45 are stopped by the stopping portions 33, 33, and therefore the intake valves V$_I$, V$_I$ and the exhaust valves V$_E$, V$_E$ remain closed or stopped, thereby providing the stopped state of the cylinder.

When the first and second connection switch-over means 98$_1$ and 98$_2$ in the intake valve operating device 29$_I$' are operated to the connecting state while maintaining the third connection switch-over means 54 in the disconnecting state, and the connection switch-over means 55$_1$, 55$_1$ in the exhaust valve operating device 29$_E$ are operated to the connecting state, the first intake valve-side driving rocker arm 88 is connected to the first intake valve-side free rocker arm 90; the second intake valve-side driving rocker arm 89 is connected to the second intake valve-side free rocker arm 91, and the first and second exhaust valve-side driving rocker arms 44 and 45 are connected to the exhaust valve-side free rocker arm 46. Therefore, one intake valve V$_I$ is substantially closed and stopped due to the fact that the first intake valve-side free rocker arm 88 is in the substantially stopped state, while the other intake valve V$_I$ is opened and closed with a characteristic corresponding to the profile of the intake valve-side operating cam 94 by operation of the second intake valve-side free rocker arm 91 by the first operating cam 94, and the exhaust valves V$_E$, V$_E$ are opened and closed with a characteristic corresponding to the profile of the exhaust valve-side operating cam 34. Thus, in a condition in which the one intake valve V$_I$ is in the substantially stopped state, a swirl can be produced within the combustion chamber 13 in response to the other intake valve V$_I$ being opened and closed, thereby enhancing the combustibility and performing the circulation of a large amount of exhaust gas and the lean combustion in a range of low speed of the engine to provide a reduction in specific fuel consumption and an enhancement in drivability.

Further, when the third connection switch-over means 54 of the intake valve operating device 29$_I$' is operated to a connecting state and the connection switch-over means 55$_1$, 55$_1$ of the exhaust valve operating device 29$_E$ is maintained in the connecting state, the first and second intake valve-side driving rocker arms 88 and 89 are connected to the third intake valve-side free rocker arm 92, and the first and second exhaust valve-side driving rocker arms 44 and 45 remain connected to the exhaust valve-side free rocker arm 46. Thus, the intake valves V$_I$, V$_I$ are opened and closed with the characteristic corresponding to the profile of the second operating cam 95 by operation of the third intake valve-side free rocker arm 92 by the second operating cam 95, and the exhaust valves V$_E$, V$_E$ are opened and closed with the characteristic corresponding to the profile of the exhaust valve-side operating cam 34. Moreover, the second operating cam 95 has a profile which permits a valve lift amount larger than that provided by the first operating cam 94 and therefore, the intake valves V$_I$, V$_I$ can be opened and closed with a characteristic more suitable for a range of high speed of the engine, thereby providing an increase in power output.

Although the embodiments of the present invention have been described in detail, it will be understood that the present invention is not limited to the above-described embodiments, and various modifications in design may be made without departing from the spirit and scope of the invention defined in claims.

What is claimed is:

1. A valve operating system for a multi-cylinder internal combustion engine, comprising:

intake valves independently operatively connected to first and second driving rocker arms which abut against a pair of circular shaped stopping portions provided on a cam shaft;

a first free rocker arm abutting against a substantially stopping cam which is provided on said cam shaft and has a profile capable of maintaining one of said intake valves in a substantially stopped state, but causing said intake valve to be slightly opened during a valve-opening timing;

a second free rocker arm abutting against an operating cam which is provided on said cam shaft and has a profile capable of opening said intake valves;

a first connection switch-over means provided in said first driving rocker arm and said first free rocker arm and capable of switching over between a connection and a disconnection of said first driving rocker arm and said first free rocker arm;

a second connection switch-over means provided in said second driving rocker arm and said second free rocker arm and capable of switching over between a connection and a disconnection of said second driving rocker arm and said second free rocker arm; and a third connection switch-over means provided in said first driving rocker arm, said second driving rocker arm and said second free rocker arm and capable of switching over between a connection and a disconnection of said first driving rocker arm, said second driving rocker arm and said second free rocker arm.

2. A valve operating system for a multi-cylinder internal combustion engine, comprising:

intake valves independently operatively connected to first and second driving rocker arms which abut against a pair of circular shaped stopping portions provided on a cam shaft;

a first free rocker arm abutting against a substantially stopping cam which is provided on said cam shaft and has a profile capable of maintaining one of said intake valves in a substantially stopped state, but causing said intake valve to be slightly opened during a valve-opening timing;

a second free rocker arm abutting against a first operating cam which is provided on said cam shaft and has a profile capable of opening and closing said intake valves;

a third free rocker arm abutting against a second operating cam which is provided on said cam shaft and has a profile capable of opening and closing said intake valves with a valve lift amount larger than a valve lift amount of said first operating cam;

a first connection switch-over means provided in said first driving rocker arm and said first free rocker arm and capable of switching over between a connection and a disconnection of said first driving rocker arm and said first free rocker arm;

a second connection switch-over means provided in said second driving rocker arm and said second free rocker arm and capable of switching over between a connection and a disconnection of said second driving rocker arm and said second free rocker arm; and a third connection switch-over means provided in said first driving rocker arm, said second driving rocker arm and said third free rocker arm and capable of switching over between a connection and a disconnection of said first driving rocker arm, said second driving rocker arm and said third free rocker arm.

3. A valve operating system according to claim 1 or 2, further including exhaust valves independently operatively connected to first and second exhaust-side driving rocker arms which abut against said pair of circular shaped stopping portions provided on said cam shaft;

an exhaust-side free rocker arm abutting against an operating cam which is provided on said cam shaft and has a profile capable of opening and closing said exhaust valves;

an exhaust-side connection switch-over means provided in said first and second exhaust-side driving rocker arms and said exhaust-side free rocker arm for switching over between a connection and a disconnection of said first and second exhaust-side driving rocker arms and said exhaust-side free rocker arm.

4. A valve operating system according to claim 3, wherein means are provided for causing substantially simultaneous switching over of said first connection switch-over means and said exhaust-side connection switch-over means between said connection and disconnection states.

5. A valve operating system for a cylinder of a multi-cylinder internal combustion engine, comprising:

first and second intake valves independently operatively connected to first and second driving rocker arms, respectively, said first and second driving rocker arms separately engaging first and second circular shaped stopping portions, respectively, provided on a cam shaft;

a first free rocker arm engaging a substantially stopping cam provided on said cam shaft, said substantially stopping cam having a profile for maintaining said first intake valve in a substantially stopped state by closing said first intake valve except for only slightly opening said first intake valve for a short duration during valve-opening timing;

a second free rocker arm engaging an operating cam provided on said cam shaft and having a profile for causing full opening of said intake valves;

a first connection switch-over means provided in said first driving rocker arm and said first free rocker arm for selectively connecting and disconnecting said first driving rocker arm and said first free rocker arm;

a second connection switch-over means provided in said second driving rocker arm and said second free rocker arm for selectively connecting sand disconnecting said second driving rocker arm and said second free rocker arm; and a third connection switch-over means provided in said first driving rocker arm, said second driving rocker arm and said second free rocker arm for selectively connecting and disconnecting said first driving rocker arm, said second driving rocker arm and said second free rocker arm.

6. A valve operating system for a cylinder of a multi-cylinder internal combustion engine, comprising:

first and second intake valves independently operatively connected to first and second driving rocker arms, respectively, said first and second driving rocker arms separately engaging first and second circular shaped stopping portions, respectively, provided on a cam shaft;

a first free rocker arm engaging a substantially stopping cam provided on said cam shaft, said substantially stopping cam having a profile for maintaining said first intake valve in a substantially stopped state by closing said first intake valve except for only slightly opening said first intake valve during a valve-opening timing;

a second free rocker arm engaging a first operating cam provided on said cam shaft and having a profile for causing of opening and closing of said intake valves;

a third free rocker arm engaging a second operating cam provided on said cam shaft and having a profile for causing opening and closing of said intake valves with a valve lift amount larger than a valve lift amount caused by said first operating cam;

a first connection switch-over means provided in said first driving rocker arm and said first free rocker arm for selectively connecting and disconnecting said first driving rocker arm and said first free rocker arm;

a second connection switch-over means provided in said second driving rocker arm and said second free rocker arm for selectively connecting and disconnecting said second driving rocker arm and said second free rocker arm; and a third connection switch-over means provided in said first driving rocker arm, said second driving rocker arm and said third free rocker arm for selectively connecting and disconnecting said first driving rocker arm, said second driving rocker arm and said third free rocker arm.

7. A valve operating system for a cylinder of a multi-cylinder internal combustion engine comprising:

first and second intake valves in the cylinder;

a cam shaft having at least one portion of no valve a substantially circular cam with a small cam lobe of short radial height and circumferential length, and at least one operating cam having a valve-opening cam lobe;

means for selectively operating said intake valves in one of three modes, namely, (1) maintaining said first and second intake valves closed for stopping operation of the cylinder, (2) operating said first intake valve by said substantially circular cam and operating said second intake valve by said operating cam, and (3) operating said first and second intake valves by said at least one operating cam.

8. A valve operating system according to claim 7, wherein a single operating cam is provided and comprises said operating cam for modes (2) and (3).

9. A valve operating system according to claim 7, wherein first and second operating cams are provided, said first operating cam being used in said mode (2) operation and said second operating cam be used in said mode (3) operation.

10. A valve operating system according to claim 7, 8 or 9, wherein a completely circular portion is provided on said cam shaft for each intake valve and is used for causing said mode (1) operation.

11. A valve operating system according to claim 7, 8 or 9, wherein first and second driving rocker arms are operatively and separately connected to said first and second intake valves, first and second free rocker arms engage said substantially circular cam and operating cam, respectively, and said means for selectively operating include means for selectively connecting and disconnecting said first and second driving rocker arms to said first and second free rocker arms.

12. A valve operating system according to claim 11, wherein first and second completely circular portions are provided on said cam shaft, and said first and second driving rocker arms engage said first and second completely circular portions for causing said mode (1) operation.

* * * * *